United States Patent
Christensen et al.

(10) Patent No.: US 7,793,964 B2
(45) Date of Patent: Sep. 14, 2010

(54) METHOD OF TRANSPORTATION OF A WIND TURBINE NACELLE AND USE THEREOF

(75) Inventors: Mogens Christensen, Tjele (DK); Lars Budtz, Ringkøbing (DK)

(73) Assignee: Vestas Wind Systems A/S (DK)

( * ) Notice: Subject to any disclaimer, the term of this patent is extended or adjusted under 35 U.S.C. 154(b) by 601 days.

(21) Appl. No.: 10/504,949

(22) PCT Filed: Feb. 19, 2003

(86) PCT No.: PCT/DK03/00109

§ 371 (c)(1), (2), (4) Date: Feb. 1, 2005

(87) PCT Pub. No.: WO03/071130

PCT Pub. Date: Aug. 28, 2003

(65) Prior Publication Data

US 2005/0123382 A1    Jun. 9, 2005

(30) Foreign Application Priority Data

Feb. 19, 2002    (EP) ................................. 02075658

(51) Int. Cl.
*B60P 3/00* (2006.01)
(52) U.S. Cl. ...................... 280/404; 414/458
(58) Field of Classification Search .......... 280/404, 280/476.1; 414/458, 373; 52/745.02; 410/53
See application file for complete search history.

(56) References Cited

U.S. PATENT DOCUMENTS

| | | | |
|---|---|---|---|
| 1,996,695 A | | 4/1935 | Bigley, Jr. |
| 2,936,910 A | * | 5/1960 | Page ............................ 414/267 |
| 3,193,301 A | * | 7/1965 | Talbert et al. ............. 280/43.23 |
| 3,243,193 A | * | 3/1966 | Bivins et al. ................... 280/35 |
| 3,315,974 A | * | 4/1967 | Weaver, Jr. et al. ......... 280/43.2 |
| 3,392,857 A | * | 7/1968 | Tantlinger .................... 414/458 |
| 3,420,541 A | * | 1/1969 | Flurscheim .............. 280/43.23 |
| 3,438,652 A | * | 4/1969 | Hoffacker ................. 280/476.1 |
| 3,520,430 A | * | 7/1970 | Dunbar ........................ 414/458 |
| 3,626,867 A | * | 12/1971 | Becker ......................... 105/362 |
| 3,631,999 A | * | 1/1972 | Walerowski ................. 414/458 |
| 3,708,037 A | * | 1/1973 | Tranchero .................... 182/2.3 |
| 3,795,336 A | * | 3/1974 | Acker et al. ................. 414/458 |
| 3,801,132 A | * | 4/1974 | Haynie et al. ................ 280/404 |
| 3,834,111 A | * | 9/1974 | Acker et al. ............. 52/745.02 |

(Continued)

FOREIGN PATENT DOCUMENTS

AU    197840300    9/1980

(Continued)

OTHER PUBLICATIONS

International Search Report; PCT/DK03/00109; Jun. 10, 2003.

(Continued)

*Primary Examiner*—Lesley Morris
*Assistant Examiner*—Daniel Yeagley
(74) *Attorney, Agent, or Firm*—St. Onge Steward Johnston & Reens LLC

(57) ABSTRACT

The invention relates to a nacelle that is releasably attachable, the nacelle being adapted for suspension of the nacelle between at least two wheel sets as completely or partly self-supporting suspension.

16 Claims, 5 Drawing Sheets

U.S. PATENT DOCUMENTS

| | | | | |
|---|---|---|---|---|
| 3,929,241 | A * | 12/1975 | Putnam | 414/458 |
| 4,199,298 | A * | 4/1980 | Webre et al. | 414/458 |
| 4,231,709 | A * | 11/1980 | Corsetti | 414/458 |
| 4,237,384 | A * | 12/1980 | Kennon | 290/55 |
| 4,260,141 | A * | 4/1981 | Nagati | 266/287 |
| 4,452,555 | A * | 6/1984 | Calabro | 410/53 |
| 4,527,072 | A * | 7/1985 | van Degeer | 290/55 |
| 4,570,959 | A | 2/1986 | Grinwald | |
| 4,729,570 | A * | 3/1988 | Welch, Jr. | 280/837 |
| 4,792,700 | A * | 12/1988 | Ammons | 290/55 |
| 5,779,255 | A * | 7/1998 | Garcia, Jr. | 280/404 |
| 2006/0251517 | A1 * | 11/2006 | Grabau | 416/202 |
| 2007/0036655 | A1 * | 2/2007 | Damgaard et al. | 416/170 R |
| 2007/0145181 | A1 * | 6/2007 | Pedersen | 244/16 |

FOREIGN PATENT DOCUMENTS

| | | |
|---|---|---|
| DE | 872 432 | 4/1953 |
| DE | 1 136 902 | 9/1962 |
| DE | 74 01 022 U | 4/1974 |
| DE | 74 010 22 | 4/1974 |
| DE | 100 63 136 | 1/2002 |
| EP | 0 618 127 | 10/1994 |
| EP | 1003182 A1 * | 5/2000 |
| EP | 1 045 139 | 10/2000 |
| EP | 1 101 936 | 5/2001 |
| JP | 2000006849 | 1/2000 |
| JP | 2001018852 | 1/2001 |
| JP | 2001233252 | 8/2001 |
| JP | 2002-59776 | 2/2002 |
| WO | WO 97/03288 | 1/1997 |
| WO | 02/04321 | 1/2002 |

OTHER PUBLICATIONS

The Middelgrunden Offshore Wind Farm—A popular Initiative, http//www.middelgrunden.dk/MG_UK/product_info/turbine.htm.
Langes Warten, Windblatt Apr. 2001, Magazine by Enercon GmbH.
WindPACT Turbine Design Scaling Studies, Technical Area 2: Turbine, Rotor, and Blade Logistics, NREL/SR-500-29439, Kevin Smith, National Renewable Energy Laboratory.
The Construction of Tomamae Wind-Villa power Plant and an Outline of the Plant, S.Sasaki, S. Shimizu (J-Power, Electric Power Development Co Ltd.).

* cited by examiner

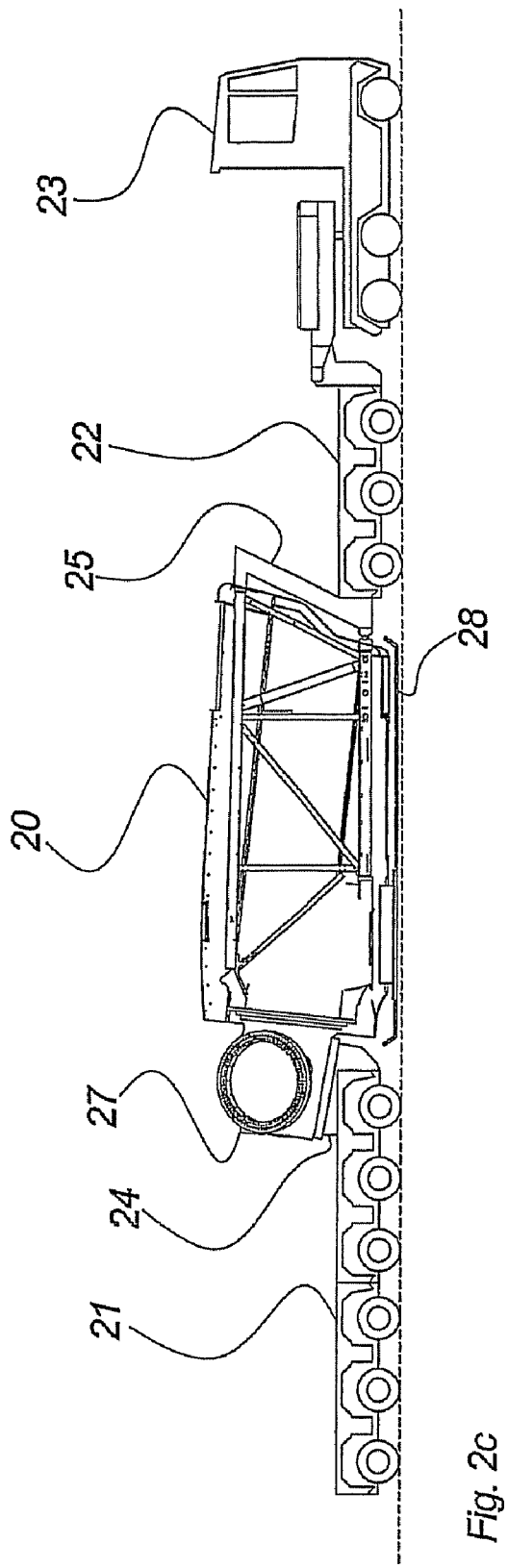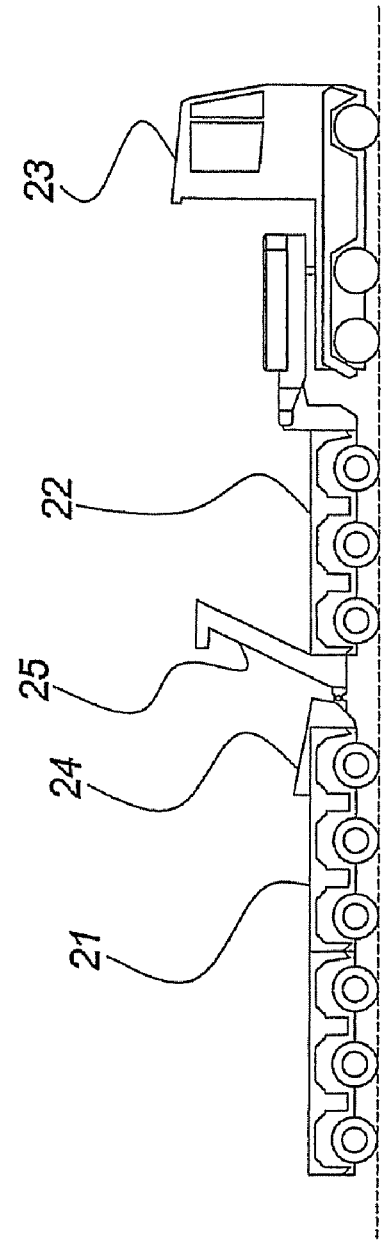
Fig. 2c
Fig. 2d

METHOD OF TRANSPORTATION OF A WIND TURBINE NACELLE AND USE THEREOF

TECHNICAL FIELD OF THE INVENTION

The present invention relates to a wind turbine nacelle, and particularly, to a vehicle for transporting a wind turbine nacelle, a nacelle for being transported, a method of transporting a nacelle, and a method of loading a nacelle.

BACKGROUND OF THE INVENTION

Typically, wind turbine nacelles are transported to the mounting site by means of large trucks capable of carrying the relevant load.

SUMMARY OF THE INVENTION

The invention relates to a vehicle comprising at least two wheel sets and at least one nacelle, said nacelle being suspended between said at least two wheel sets.

According to the invention, several advantages may be obtained by suspending a nacelle between at least two wheel sets.

One advantage is that the complete vertical extension of the vehicle may be reduced compared to traditional nacelle transportation setups due to the fact that the frame structure of the nacelle forms part of the complete vehicle. Moreover, advantageous logistics may be obtained due to the fact that the vehicle may be reduced to comprising two relatively short bogies once a nacelle has been delivered at the delivery site. Therefore, further transportation of the wheel sets may be performed without escort and special route planning.

When, at least one of said wheel sets forms a trailer, a further advantageous embodiment of the invention has been obtained.

According to the invention, the vehicle may advantageously comprise standard transportation components, such as trailers suitable for other transportation purposes.

Typically, the trailers may be pulled by a suitable truck.

According to an embodiment of the invention, the wheel sets may be self-propelled.

According to the invention, the at least one wheel set may e.g. be comprised by a truck or the like.

When at least one of said wheel sets comprises elevation means, a further advantageous embodiment of the invention has been obtained.

The elevation means may advantageously be comprised in the wheel sets as integrated hydraulic leveling means.

The elevation means may advantageously be hydraulic.

When said lifting means is integrated in the wheel sets, a further advantageous embodiment of the invention has been obtained.

When said vehicle comprises moment-absorbing attachment means, a further advantageous embodiment of the invention has been obtained.

The moment-absorbing attachment means may e.g. be established for force equalization on the axles of a wheel set, thereby facilitating suspension of even very heavy nacelles between the wheel sets. In other words, the nacelle may be lowered so much that it more or less defines the complete vertical extension of the vehicle, only supplemented by the vertical extension of a small security distance gap between the nacelle and the ground surface.

The moment-absorbing means may be established as static mechanical structures or advantageously be means of dynamic moment-absorbing means.

When said moment-absorbing attachment means comprises variable moment-absorbing attachment means, a further advantageous embodiment of the invention has been obtained.

Examples of such moment-absorbing means may be established by means of hydraulic moment-absorbing means capable of e.g. providing a fixed moment during transport of the nacelle.

When said moment attachment means comprises the hub of the nacelle, a further advantageous embodiment of the invention has been obtained.

According to the invention, the hub of a nacelle may advantageously be applied for transferring forces from the nacelle to the wheel set.

When using at least two vehicles as defined above for transportation of at least one nacelle, a further advantageous embodiment of the invention has been obtained.

Moreover, the invention relates to a nacelle comprising releasable attachment means, said attachment means being adapted for suspension of said nacelle between at least two wheel sets as completely or partly self-supporting suspension.

According to the invention, the nacelle may in principle form part of the constructive members of a transportation vehicle. Evidently, such nacelle must necessarily be constructed in a way so that it can absorb the forces affecting the nacelle structure during both transportation, and of course, use at the final destination as a wind turbine nacelle.

When said nacelle is self-supporting between said attachment means, a further advantageous embodiment of the invention has been obtained.

When applying a completely self-supporting frame structure to the nacelle, additional frame reinforcement may be avoided during transportation.

When said attachment means comprises at least two attachment arrangements, a further advantageous embodiment of the invention has been obtained.

According to the invention, discrete point attachment may be applied. In particular, four-point attachment may be obtained.

Evidently, several other suitable attachment arrangements may be applied within the scope of the invention as long as they are capable of absorbing the relevant forces, expressed as e.g. vertical and horizontal moment.

When said attachment means comprises at least one front attachment arrangement and at least one rear attachment arrangement, a further advantageous embodiment of the invention has been obtained.

When said front attachment comprises at least part of the hub, a further advantageous embodiment of the invention has been obtained.

According to the invention, the hub of a wind turbine may advantageously be applied as the front attachment arrangement.

Moreover, the invention relates to a method of transporting at least one wind turbine nacelle provided with at least two wheel sets, and when suspending said at least one wind turbine nacelle between said at least two wheel sets, a further advantageous embodiment of the invention has been obtained.

When said at least two wheel sets comprise releasable attachment means, and at least one of said releasable attachment means is liftable by means of lifting means, and the at least one wind turbine nacelle is attached to said at least two wheel sets by means of the releasable attachment means, and the nacelle is lifted by means of said at least one attachment arrangement, a further advantageous embodiment of the invention has been obtained.

Moreover, the invention relates to a method of loading at least one wind turbine nacelle onto a vehicle arrangement comprising at least two wheel sets, and when suspending said at least one wind turbine nacelle between said at least two wheel sets, a further advantageous embodiment of the invention has been obtained.

BRIEF DESCRIPTION OF THE FIGURES

The invention will be described in detail in the following with reference to the figures, of which FIGS. 2a to 2d illustrate the main transportation actions of a nacelle according to the invention, FIGS. 4 to 7b illustrate different embodiments of moment-absorbing suspension according to the invention.

DETAILED DESCRIPTION

Figure 1:
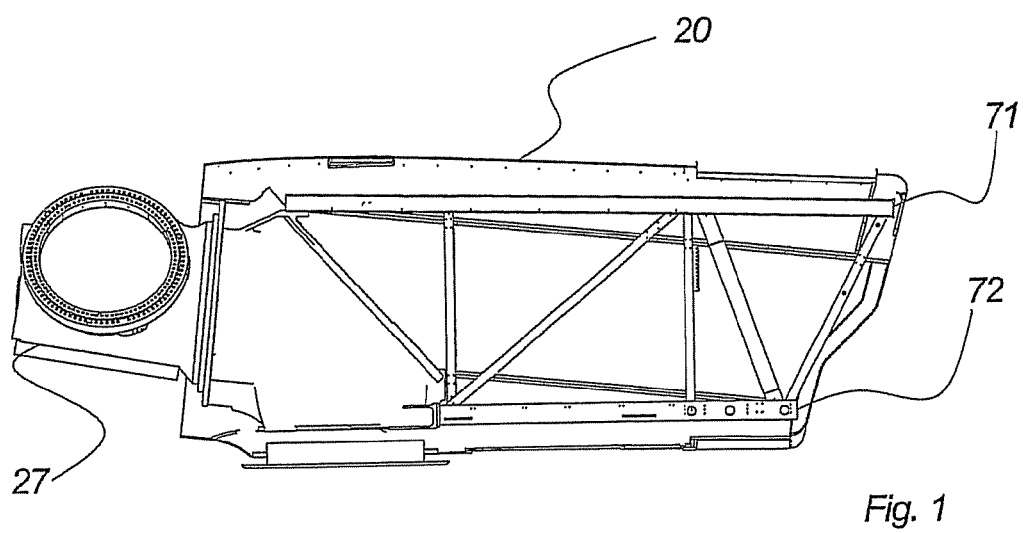
FIG. 1 illustrates a wind turbine nacelle according to the invention.

FIG. 1 illustrates a cross-section of a wind turbine nacelle according to one embodiment of the invention.

The illustrated nacelle 20 comprises a basic structure represented by a welded or molded machine frame on which the main structures of the wind turbine are founded or suspended.

Such main components may e.g. include generator, yaw, rotor shaft, gears, etc.

According to the invention, the basic structure is provided with at least two mutually displaced engagement arrangements 27 and 71, 72.

The engagement arrangements 71, 72 are either included in or fitted to the basic structure.

FIGS. 2a to 2d illustrate the main transport actions demonstrating logistic features of an advantageous embodiment of the invention.

Figure 2A:

FIG. 2a illustrates two wheel sets according to the invention.

The wheel sets comprise attachment precautions, which are described below.

The wheel sets are basically modular trailers 21, 22. The trailers 21, 22 comprise means 19, e.g. hydraulic means, for lowering or raising the wheels.

The trailer 21 comprises one attachment arrangement 24 and the trailer 22 comprises another attachment arrangement 25.

Figure 2B:
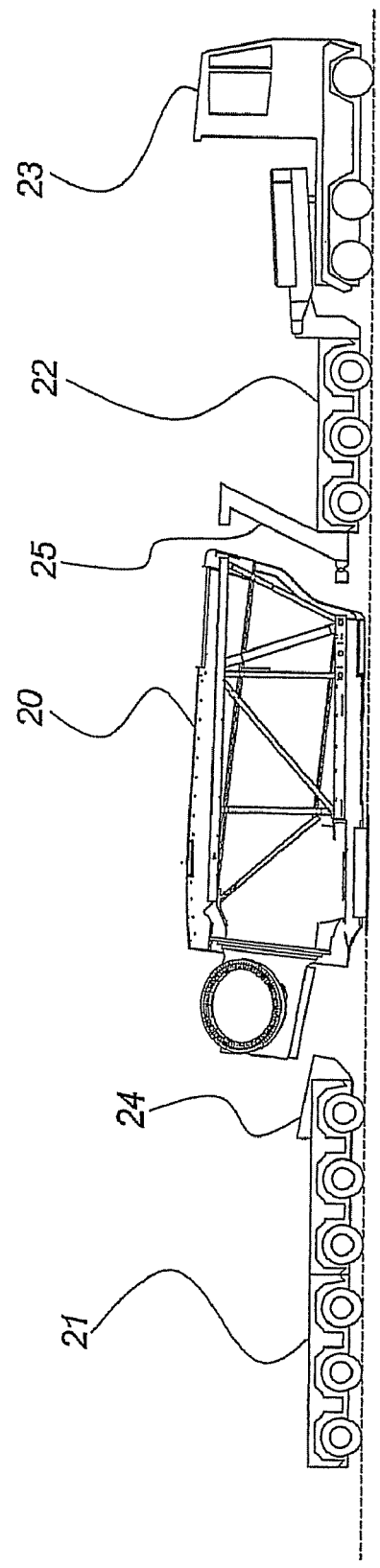

In FIG. 2b, the wheels of the trailers 21, 22 have been raised so that the carrier has been lowered. Then, the trailers have been positioned in relation to a nacelle 20, facilitating fixed attachment of the trailer to the carrier 21, 22.

In FIG. 2c, the trailers have been raised by lowering the wheels of the trailers and the nacelle 20 has been lifted from the ground.

Subsequently, the trailers 21, 22 and the nacelle 20 constitute a combined vehicle, which may be pulled by e.g. a truck 23 or other kinds of suitably powered vehicles.

Moreover, the illustrated vehicle is mounted with a sub-cover 28 adapted for protecting the sub-portion of the nacelle 20 against scratches etc. during transport.

FIG. 2d illustrates the trailers 21, 22 that have now been unloaded, typically by lowering the trailers 21, 22, detaching the nacelle 20 and removing the trailers 21, 22 from the nacelle 20.

Now the trailers 21, 22 may be mutually coupled thereby forming one combined trailer, which may be transported by e.g. truck.

In other words, FIG. 2b illustrates a trailer made up by two trailers 21, 22 and a nacelle 20 in combination, while the trailer in FIG. 2d basically illustrates a new trailer formed by the trailers 21, 22.

An important aspect of this fact is that the new trailer may now be formed by two relatively short trailers 21, 22. Therefore, the new trailer may typically form part of a vehicle, e.g. including truck having a length of less than e.g. 18 meters. This means that the homebound (return) transportation of the trailers 21, 22 may be a simple operation, which may be performed without escort and requirements for numerous different transport applications, permissions etc. by the relevant authorities.

It should be noted that the above-described preferred embodiment of the invention features an "onboard lift". Evidently, the loading of the nacelle onto the trailers may be performed by means of a traditional external lift, although the preferred load/unload procedure is performed by means of lifting means integrated in the trailer or trailers.

Figure 3A:
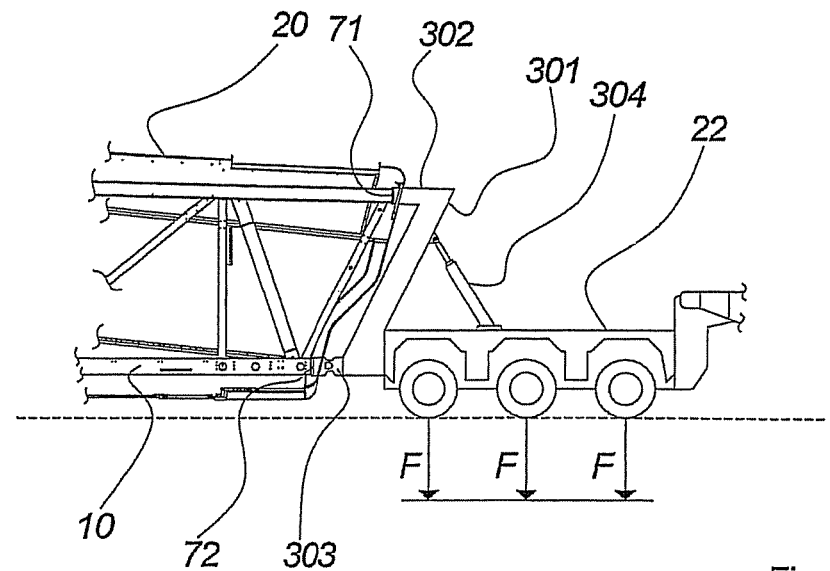
FIGS. 3a and 3b illustrate the details of wind turbine nacelle suspension according to the invention.

FIG. 3a illustrates some advantageous features of the above-described embodiment of the invention with respect to force distribution and orientation.

The illustration illustrates the principle mechanical attachment of the rear part of the nacelle 20 to the trailer 22.

Basically, the nacelle 20 comprises a rear attachment arrangement. According to the illustrated embodiment, the rear attachment comprises four attachment members 71, 72, of which only two are shown in a cross-section, one on each side of the rear part of the nacelle 20. The attachment members 71, 72 are fitted to or comprised in the main frame 10 of the nacelle 20.

The attachment members facilitate mechanical four-point coupling of the main frame to the attachment arrangement 25 of the trailer 22, which creates absorption of moment both in the vertical and horizontal direction.

The trailer 22 comprises an attachment arrangement 301 fitted with attachment fittings 302, 303 attachable to the aforementioned attachment means 71, 72.

A hydraulic arrangement 304 forms part of the attachment arrangement. The hydraulic arrangement 304 is capable of evening out force exercised on the axles of the trailer 22.

Moreover, the hydraulic arrangement 304 may advantageously be applied for absorbing moment variation by means of suitable measuring and control equipment not shown.

In this way, suspension of the nacelle 20 by the above-described attachment arrangement may absorb high moment and be able to transfer force F to the axles of the trailer 22 in such a way that the resulting force F exercised on the axles is relatively uniform.

Evidently, according to the invention, the main frame 10 of the nacelle 20 should be dimensioned in such a way that it is able to absorb the moment transferred from the attachment arrangement, alone or in combination with other attachment arrangements, e.g. a front attachment arrangement.

Figure 3B:
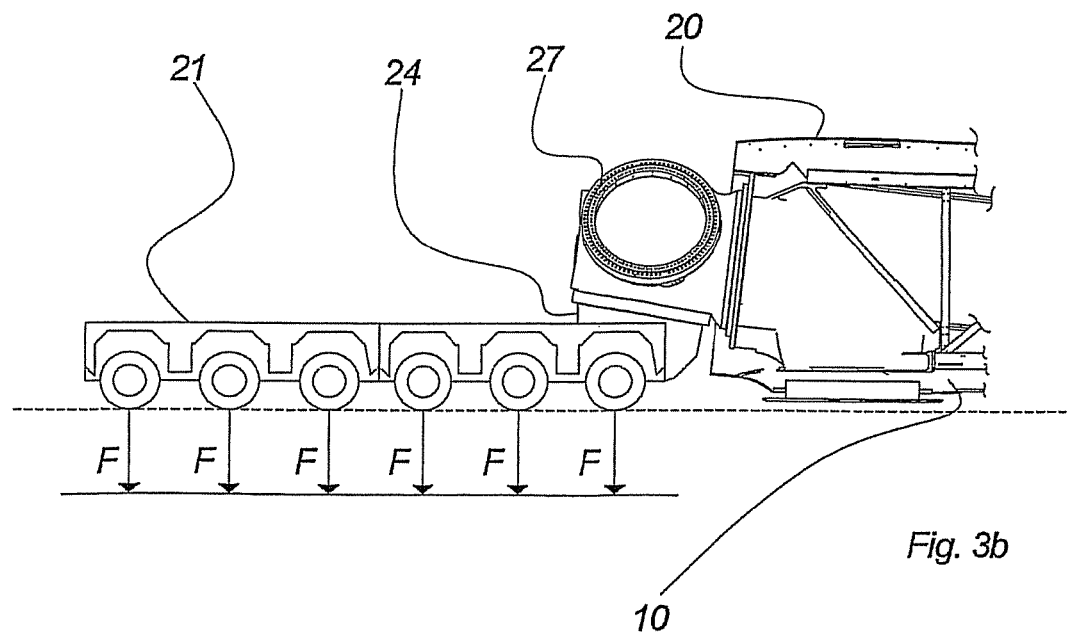

FIG. 3b illustrates some advantageous features of the above-described embodiment of the invention with respect to force distribution and orientation.

The illustration illustrates the principle mechanical attachment of the front part of the nacelle 20 to the trailer 21.

Basically, the main functionality of the illustrated suspension is the same as that of the above-described suspension, i.e. to even out force exercised on the axles of the trailer 21 as much as possible.

However, the illustrated suspension is obtained by suspending the nacelle 20 to an attachment arrangement 24 on the trailer 21. The attachment arrangement 24 receives an attachment arrangement of the nacelle 20, here comprised by the hub 27 of the nacelle 20.

Again, the hub 27 must be able to absorb the induced moment in combination with the main frame of the nacelle 20.

It should be noted that it is a condition, according the above-illustrated embodiment of the invention, that the relevant part of the mechanical structure of the nacelle 20 is self-sustaining.

Figure 4:
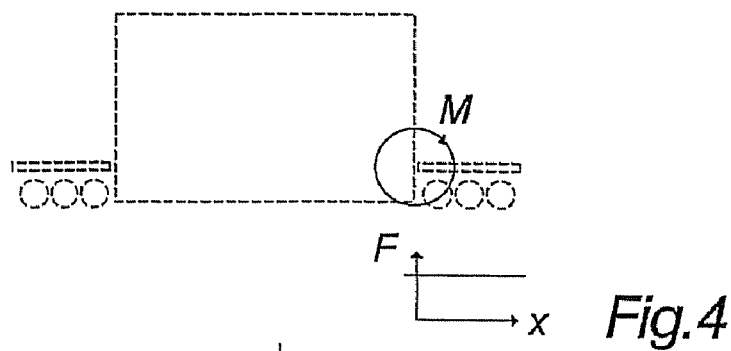

FIG. 4 basically illustrates the moment absorbed by suspension according to the invention. Again, the suspension should feature the ability to absorb a suitably high moment in order to even out force F exercised on the trailer axles.

Figures 5A, 5B:
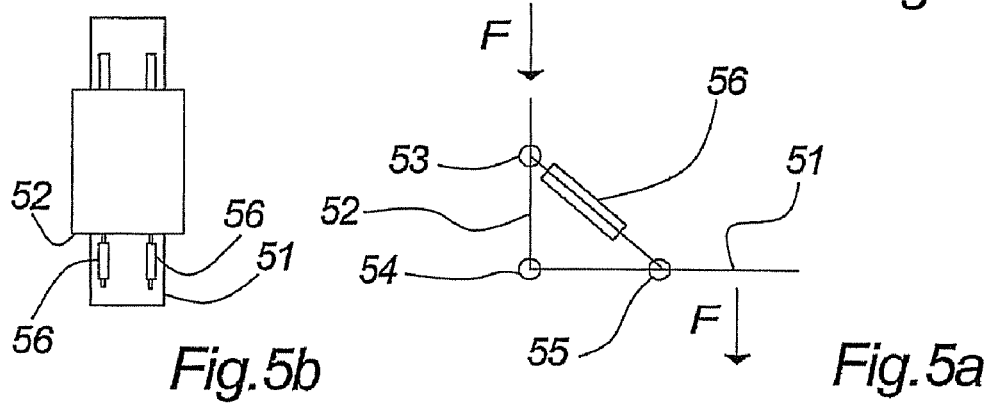
Figures 6A, 6B:
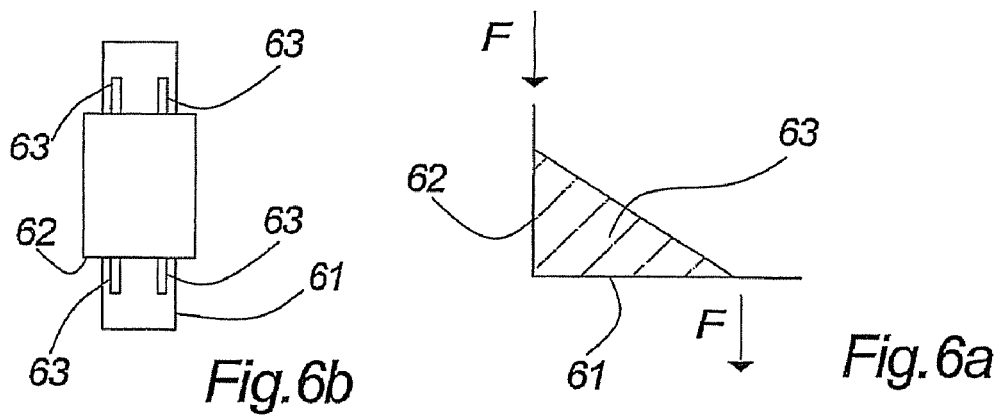
Figures 7A, 7B:
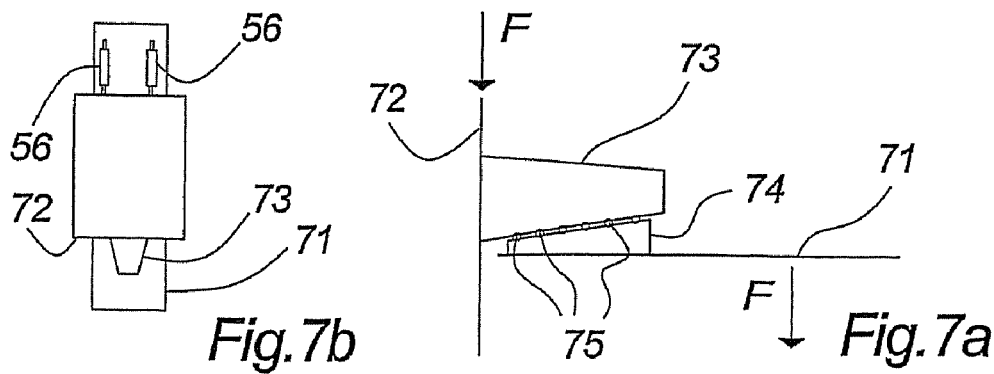

FIGS. 5a, 6a and 7a illustrate the principles of different preferred suspension arrangements according to the different embodiments of the invention.

FIGS. 5b, 6b and 7b illustrate different applicable combinations of suspension arrangements according to the invention.

Evidently, several other combinations may be applied within the scope of the invention than the three-point and four-point suspensions mentioned below.

FIG. 5a illustrates the cross-section of discrete point suspension according to one embodiment of the invention. Here, suspension is supplemented by further discrete point suspension in the plane.

Basically, FIG. 5a illustrates suspension of a nacelle part 52 to a trailer part 51.

The illustrated suspension is established by suspension of discrete points 53, 54, 55 in one cross-section.

The force F directed to the points 53, 54 is transferred by means of a moment absorbing arrangement, here comprised by a hydraulic cylinder 56.

FIG. 5b illustrates four-point suspension of a nacelle as illustrated and explained in FIG. 5a seen from above.

Please note that the illustrated rear suspension principally comprises two of the above-described arrangements.

Evidently, in this context, four-point suspension refers to suspension in which a nacelle is basically attached to four areas when seen from above (i.e. not necessarily four points exclusively).

Thus, the illustrated four-point suspension is basically capable of absorbing moment as illustrated in FIG. 5a, i.e. a gravity force distribution arrangement. In addition, it is also capable of absorbing moment in the transverse direction, as illustrated in FIG. 5b.

FIG. 6a illustrates the cross-section of a rigid moment-absorbing arrangement 63.

Here, rigid suspension is established between a nacelle part 62 and a trailer part 61 by means of a rigid mechanical construction 63.

Again, 6b illustrates suspension of a nacelle as illustrated and explained in FIG. 6a when seen from above, i.e. here by means of two rigid moment-absorbing arrangements 63 capable of absorbing suspension moment in both the vertical and horizontal direction.

Numerous moment-absorbing suspensions are applicable within the scope of the invention.

FIG. 7a illustrates a further embodiment of the invention, here more or less corresponding to the hub suspension illustrated in FIGS. 2a-d and FIGS. 3a-b.

Here, a nacelle part 72 is suspended to a trailer part 71.

The trailer part 71 is mounted with a hub receiving arrangement 74, to which the hub 73 of a wind turbine nacelle 72 is attached e.g. by bolts in the points 75.

When displacing the attachment members mutually 75, it will be possible to transfer attachment forces via a moment conversion arrangement arranged on the trailer.

According to the invention, the moment conversion arrangement facilitates distribution of force on the trailer axles in a more homogeneous manner. Hence, force exercised on the axles of a trailer in which the nacelle is suspended may be uniformly or at least relatively uniformly distributed on the axles of the trailer.

FIG. 7b may also be referred to as three-point suspension (with respect to horizontal moment force).

Basically, FIG. 7 illustrates a "three-point" suspension, wherein a hub 73 comprises part of a front-moment absorbing arrangement and wherein two hydraulic cylinders 56 comprise part of a rear-moment absorbing arrangement.

The invention claimed is:

1. Vehicle for transporting a self-supporting wind turbine nacelle, said vehicle comprising:
    at least two wheel sets;
    wherein said vehicle comprises a first configuration wherein said nacelle is suspended between said at least two wheel sets so that said nacelle is hanging between said at least two wheel sets, and said at least two wheel sets are structurally connected to one another only via said nacelle;
    wherein said vehicle comprises a second configuration wherein said nacelle is absent, and said at least two wheel sets are connected to one another other than via said nacelle;
    wherein said wind turbine nacelle comprises a hub; and
    wherein said wind turbine nacelle further comprises an attachment member for attachment to a wind turbine tower.

2. Vehicle according to claim 1, wherein at least one of said sets forms a trailer.

3. Vehicle according to claim 1, wherein at least one of said wheel sets comprises lifting means.

4. Vehicle according to claim 3, wherein said lifting means is integrated in the wheel sets.

5. Vehicle according to claim 1, wherein said vehicle comprises moment-absorbing attachment means.

6. Vehicle according to claim 5, wherein said moment-absorbing attachment means comprises variable moment-absorbing attachment means.

7. Vehicle according to claim 5, wherein said moment attachment means comprises said hub of the nacelle.

8. Vehicle according to claim 1, further comprising a sub-cover adapted for protection of a sub-portion of the nacelle.

9. Self-supporting wind turbine nacelle, adapted for being transported as a part of a vehicle, comprising:
    releasable attachment means adapted for suspension of said wind turbine nacelle between at least two wheel sets as a completely or partly self-supporting suspension;
    wherein, in a first configuration of the vehicle, said at least two wheel sets are structurally connected to one another only via said nacelle;
    wherein, in a second configuration of the vehicle, said nacelle is absent, and said at least two wheel sets are connected to one another other than via said nacelle;
    wherein said wind turbine nacelle comprises a hub; and
    wherein said wind turbine nacelle further comprises an attachment member for attachment to a wind turbine tower.

10. Self-supporting wind turbine nacelle according to claim 9, wherein said attachment means comprises at least two attachment arrangements.

11. Self-supporting wind turbine nacelle according to claim 9, wherein said attachment means comprises at least one front attachment arrangement and at least one rear attachment arrangement.

12. Self-supporting wind turbine nacelle according to claim 11, wherein such said front attachment arrangement comprises at least part of said hub of the wind turbine nacelle.

13. Self-supporting wind turbine nacelle according to claim 9, wherein a sub-cover is adapted for protection of a sub-portion of the wind turbine nacelle.

14. Method of transporting at least one self-supporting wind turbine nacelle, comprising:

providing at least two wheel sets;

suspending said at least one wind turbine nacelle comprising a hub between said at least two wheel sets so that the nacelle is hanging between at least two wheel sets and structurally connecting said at least two wheel sets to one another only via said nacelle;

removing said nacelle once the nacelle is delivered to a destination and connecting said at least two wheel sets to one another other than via said nacelle; and attaching said wind turbine nacelle to a wind turbine tower via an attachment member provided on said wind turbine nacelle.

15. Method for transporting at least one self-supporting wind turbine nacelle according to claim 14, further comprising:

providing the at least two wheel sets with releasable attachment means;

providing lifting means for lifting at least one of the releasable attachment means;

attaching the nacelle to the wheel sets by means of the releasable attachment means; and lifting nacelle by means of said at least one of the releasable attachment and the lifting means.

16. Method of transporting at least one self-supporting wind turbine nacelle according to claim 14, further comprising providing a nacelle including releasable attachment means adapted for suspension of said nacelle between at least two wheel sets as a completely or partially self-supporting suspension, said nacelle being self-supporting said attachment means.

* * * * *